United States Patent
Maurischat

(10) Patent No.: US 10,545,068 B2
(45) Date of Patent: Jan. 28, 2020

(54) ARRANGEMENT AND METHOD FOR TESTING THE TIGHTNESS OF A CONTAINER

(71) Applicant: Robert Bosch GmbH, Stuttgart (DE)

(72) Inventor: Wolfgang Maurischat, Satteldorf (DE)

(73) Assignee: Robert Bosch GmbH, Stuttgart (DE)

( * ) Notice: Subject to any disclaimer, the term of this patent is extended or adjusted under 35 U.S.C. 154(b) by 142 days.

(21) Appl. No.: 15/553,528

(22) PCT Filed: Dec. 28, 2015

(86) PCT No.: PCT/EP2015/081294
§ 371 (c)(1),
(2) Date: Aug. 24, 2017

(87) PCT Pub. No.: WO2016/134809
PCT Pub. Date: Sep. 1, 2016

(65) Prior Publication Data
US 2018/0238767 A1   Aug. 23, 2018

(30) Foreign Application Priority Data

Feb. 27, 2015   (DE) .................. 10 2015 203 552

(51) Int. Cl.
*G01M 3/32* (2006.01)
*F16K 1/44* (2006.01)
*F16K 31/122* (2006.01)

(52) U.S. Cl.
CPC ........... *G01M 3/3209* (2013.01); *F16K 1/443* (2013.01); *F16K 31/122* (2013.01)

(58) Field of Classification Search
CPC ......... G01M 3/3209; G01M 3/32; F16K 1/36; F16K 1/443; F16K 31/122
(Continued)

(56) References Cited

U.S. PATENT DOCUMENTS

| 3,792,607 A | 2/1974 | Fukuda |
| 6,513,366 B1 | 2/2003 | Stauffer |

(Continued)

FOREIGN PATENT DOCUMENTS

| EP | 2711595 | 3/2014 |
| JP | S57211032 A | 12/1982 |

(Continued)

OTHER PUBLICATIONS

International Search Report for Application No. PCT/EP2015/081294 dated Jun. 7, 2016 (English Translation, 2 pages).

*Primary Examiner* — Tarun Sinha
(74) *Attorney, Agent, or Firm* — Michael Best & Friedrich LLP

(57) ABSTRACT

The present invention relates to an arrangement for testing the tightness of a container (2), comprising a testing chamber (3), in which the container (2) which is to be tested can be arranged, also comprising a pressure-altering device (5), in order to alter a pressure in the testing chamber (3) relative to a pressure in the container (2), further comprising a differential-pressure sensor (4) for determining a pressure difference between a reference pressure in a reference chamber (6) and a pressure in the testing chamber (3), and additionally comprising a valve (7) having a closing element (70), a first sealing seat (71) and a second sealing seat (72), wherein the first sealing seat (71) comprises a first sealing element (11, 21) for sealing the reference chamber (6) in relation to an antechamber, and wherein the second sealing seat (72) comprises a second sealing element (12, 22) for sealing the testing chamber (3) in relation to the antechamber (8).

17 Claims, 6 Drawing Sheets

(58) Field of Classification Search
USPC .......................................................... 73/49.3
See application file for complete search history.

(56) References Cited

U.S. PATENT DOCUMENTS

2015/0308916 A1* 10/2015 Nelles .................... G01M 3/205
                                                              73/40.7
2015/0362419 A1* 12/2015 Chertov ............... G01N 15/088
                                                              73/38

FOREIGN PATENT DOCUMENTS

| | | |
|---|---|---|
| JP | H04194641 A | 7/1992 |
| JP | 2001235386 A | 8/2001 |
| JP | 2007304004 A | 11/2007 |
| JP | 2008311306 A | 12/2008 |
| JP | 2012042489 A | 3/2012 |
| JP | 2015125044 A | 7/2015 |
| WO | 9217721 | 10/1992 |
| WO | 2004059474 A2 | 7/2004 |
| WO | 2005036039 A1 | 4/2005 |
| WO | 2008082199 | 7/2008 |
| WO | WO-2008082199 A1 * | 7/2008 .............. G01M 3/32 |

* cited by examiner

B-B

ARRANGEMENT AND METHOD FOR TESTING THE TIGHTNESS OF A CONTAINER

BACKGROUND OF THE INVENTION

The present invention relates to an arrangement and to a method for testing the tightness of a container, in particular in the context of a quality test on packaging containers.

In the context of a quality test on closed containers, a tightness test with excess pressure or with a reduced pressure is used as a technical method. Particularly in the area of medicament packages, tightness testing is indispensable. For this purpose, the container is arranged in a testing chamber, which is put under a vacuum. A pressure rise per unit time is then measured in the vacuum zone. If the vacuum pressure remains constant or equal to a tight reference component, this is an indication of the tightness of the container. If the vacuum pressure rises during the measurement time, this is an indication, in the case of a tight testing chamber, that the container is not tight. In the same way, a reduction in the excess pressure in the testing chamber is an indication of a container that is not tight in the case of a chamber under excess pressure. However, one problem in measuring the absolute pressure level is that, the smaller the existing leaks in the container, the smaller is also the leakage flow which is present at the pressure difference built up between the interior of the container and the testing chamber. Since an achievable reduced pressure level and hence also a pressure difference is technically limited by the leak, it is possible either to work with very long measurement times or, alternatively, with very precise, expensive pressure sensors. EP 0313678 B1 furthermore discloses a method and an arrangement for testing the tightness of a hollow body in a testing chamber, in which a pressure difference is measured and evaluated by means of a differential pressure sensor between a reference pressure system and the testing chamber. It would therefore be desirable to have an improved and, in particular, more compact and technically simple, solution for testing the tightness of a container.

SUMMARY OF THE INVENTION

In contrast, the arrangement according to the invention for testing the tightness of a container, has the advantage that compact and reliable detection of a lack of tightness of a container is possible. According to the invention, use is made here of a single valve, which has a closing element and a first and a second sealing seat. It is thereby possible to implement two valve functions with one stroke of the closing element. According to the invention, it is possible, by means of a differential pressure sensor, to determine a differential pressure measurement between a testing chamber, in which the container to be tested is arranged, and a reference space, which has the same pressure as in the testing chamber at the beginning of measurement. If the container had a crack or the like, a leak would escape from the container into the testing chamber if there were a reduced pressure in the testing chamber, with the result that the pressure level of the reduced pressure would change, this being detectable by means of the differential pressure sensor in relation to the reference space. If an excess pressure were produced in the testing chamber, pressure would pass from the testing chamber into the interior of the container if there were a crack or the like in the container, with the result that the pressure in the testing chamber would fall. This can likewise be detected by means of the differential pressure sensor in relation to the reference space. In this case, the use of the differential pressure sensor can be carried out in a simple manner and independently of a height of the pressure level in the testing chamber, thus allowing testing to be carried out quickly and economically since there is no need, for example, to produce a very high excess pressure or an absolute vacuum in the testing chamber. According to the invention, a change in the pressure in the testing chamber can be achieved by means of a pressure-altering device, e.g. a compressor or a suction device. The arrangement according to the invention is also suitable, in particular, for testing products in large numbers.

The first and/or the second sealing element is/are preferably arranged on the closing element. It is thereby possible to achieve a particularly compact and simple construction. Moreover, the first and second sealing elements are preferably elastomers. It is thereby possible to enable particularly good sealing of the testing chamber and the reference space.

In order, in particular, to allow simultaneous sealing at the first and the second sealing seat, the first and the second sealing element each have an identical cross section. The cross sections are preferably circular, and the first and second sealing elements are designed as sealing rings.

According to an alternative embodiment of the present invention, the first and second sealing elements are arranged coaxially with a central axis of the valve. It is thereby possible in a simple manner to enable symmetrical construction of the valve with respect to a valve axis.

In order to achieve simultaneous opening and closure by means of the valve, the first and second sealing elements are designed as sealing rings with the same cord thickness. In order in a simple manner to achieve closure at different times at the first and the second sealing seat, the first and second sealing elements preferably have a different cord thickness. It is thereby possible to enable closure of the testing chamber and the reference space with a time offset. It is thereby furthermore possible in addition to accomplish a pressure equalization between the reference space and the testing chamber, in particular before the separation between the reference space and the testing chamber, before sealing between the testing chamber and the reference space by the second sealing seat takes place.

According to another preferred embodiment of the present invention, the arrangement furthermore comprises a filling valve, which is connected to the antechamber, and/or a vent valve, which is connected to the antechamber, and/or an absolute pressure sensor for measuring an absolute pressure in the antechamber. In this case, the filling valve brings about the production of a reduced pressure in the antechamber and, after opening of the valve, also the production of the reduced pressure in the testing chamber and in the reference space. The vent valve effects the pre-filling of the antechamber with an adjustable excess pressure, for which purpose a pressure regulator is preferably provided. After the opening of the valve, the testing chamber and the reference space are also filled with pressure again via the vent valve.

The absolute pressure sensor arranged at the antechamber is used to achieve an advance or subsequent large leak test as a supplement to the fine measurement. If the container has a large leak, the pressure of the gas volume in the container will be equalized very quickly at the beginning of the fine measurement, and it will not be possible to measure a leak by means of the longer-duration fine measurement because of the pressure equalization that has already taken place very quickly. The large leak test thus serves to check the plausibility of the result of the fine leak measurement.

For the large leak test, use is made of the antechamber in order to prefill this volume-defined chamber with a pressure different from that in the testing chamber, the antechamber then being shut off from the pressure-altering device and then connected to the testing chamber. For this purpose, the absolute pressure sensor arranged at the antechamber supplies the information via the pressure prevailing in the antechamber, this being used, in combination with knowledge of the volume of the testing chamber and the ambient pressure prevailing there, to determine a reference pressure for a large leak assessment. After the antechamber has been connected to the testing chamber by opening the measuring valve, a common, equal pressure between the two initial pressures will establish itself in both chambers. If there is a large leak in the container to be tested, the common pressure established will be different than if the container to be tested does not have a large leak because the additional gas volume in the container represents an additional equalizing volume for the common pressure formed. To determine the common pressure established after the connection of the chambers, the absolute pressure sensor at the antechamber is likewise used.

This large leak measurement can take place before the fine measurement process, i.e. is performed in advance. The antechamber volume is then filled with an excess pressure relative to the testing chamber or the antechamber volume is pumped out to give a vacuum and hence a reduced pressure relative to the testing chamber. The advantage of the advance large leak measurement is that, when a large leak is detected, the fine measurement process is not carried out and it is thus possible to avoid substances being sucked out of the container into the testing device.

This large leak measurement can also take place after the fine measurement, i.e. it is performed subsequently. The antechamber volume is then filled with a pressure that differs from that in the testing chamber, e.g. with excess pressure, in parallel with the fine measurement process, and the joining of the chambers takes place after the fine measurement process. The advantage of this method consists in the time saving owing to the parallel procedure.

According to another preferred embodiment of the present invention, all the components of the arrangement are integrated in a valve block. It is thereby possible to achieve a particularly compact construction.

The present invention furthermore relates to a method for testing the tightness of a container, which is arranged in a testing chamber. Here, the method comprises the steps of altering a pressure in the testing chamber and in a reference space, which is connected to the testing chamber, sealing off the testing chamber and the reference space by means of a single valve having a first and a second sealing seat, wherein the testing chamber is sealed off at the first sealing seat and the reference space is sealed off at the second sealing seat, and measuring a pressure difference between the testing chamber and the reference space by means of a differential pressure sensor. The differential pressure sensor can thus detect a pressure difference between the testing chamber and the reference space and thus determine a possible lack of tightness in the container.

The method according to the invention preferably closes off the testing chamber and the reference space simultaneously from an antechamber. Alternatively, the testing chamber and the reference space are respectively sealed off successively from an antechamber. In this case, the testing chamber and the reference space can first of all be sealed off from the antechamber by means of a first sealing seat provided on the valve, wherein the testing chamber and the reference space are still connected to one another. This ensures that a pressure level in the testing chamber and in the reference space is reliably the same. Following this, the testing chamber is then sealed off from the reference chamber at the second sealing seat. Here, the successive sealing can be implemented simply by means of different cord thicknesses of the sealing elements on the valve.

BRIEF DESCRIPTION OF THE DRAWINGS

Preferred illustrative embodiments of the invention are described in detail below with reference to the accompanying drawing. Here, identical or functionally identical components are denoted by the same reference signs. In the drawing.

DETAILED DESCRIPTION

An arrangement 1 in accordance with a first illustrative embodiment of the invention is described in detail below with reference to FIGS. 1 and 3.

Figure 1:
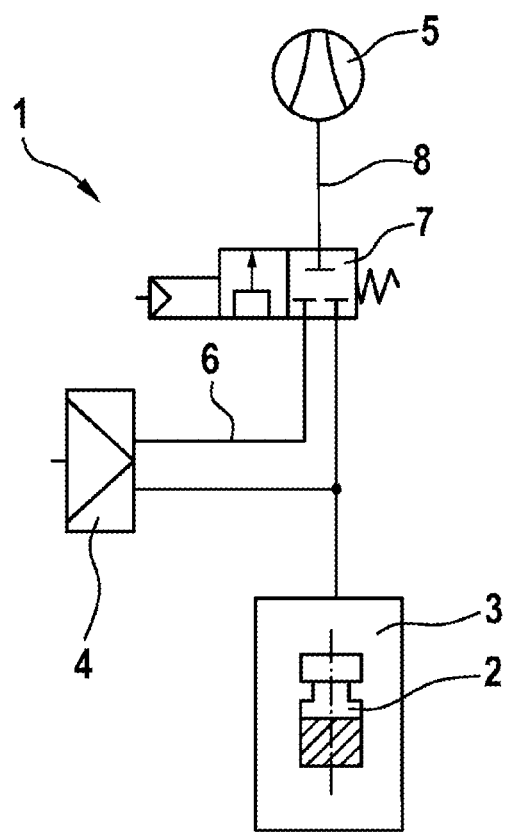
FIG. 1 shows a schematic illustration of an arrangement 1 according to the invention in accordance with a first illustrative embodiment of the invention.

As can be seen from the schematic illustration in FIG. 1, the arrangement 1 according to the invention for checking the tightness of a container 2 comprises a sealable testing chamber 3, in which the container to be tested can be arranged. The container to be tested is a vial or the like filled with a medicament, for example.

The arrangement 1 furthermore comprises a pressure-altering device 5, which is a compressor in this illustrative embodiment. By means of the pressure-altering device 5, a pressure in the testing chamber is altered relative to a pressure in the container. Here, a reduced pressure or, alternatively, an excess pressure can be produced in the testing chamber 3. In this illustrative embodiment, the testing chamber 3 is connected to the suction side of the compressor. Usually, the pressure prevailing in the container is ambient pressure, and the pressure prevailing in the testing chamber after the introduction of the container is likewise ambient pressure.

According to the invention, a differential pressure sensor 4 is furthermore provided, this being designed to determine a pressure difference between a reference pressure in a reference space 6 and a pressure in the testing chamber 3. Here, the differential pressure sensor 4 is intended to detect pressure differences between the reference space 6 and the testing chamber 3 in the course of measurement.

The arrangement 1 according to the invention furthermore comprises a valve 7 having a closing element 70, a first sealing seat 71 and a second sealing seat 72. The valve comprises a first sealing element 11 at the first sealing seat 71 for sealing off the testing chamber 3 from an antechamber 8. The valve furthermore comprises a second sealing element 12 at the second sealing seat for sealing off the reference space 6 from the antechamber 8.

Figure 2:
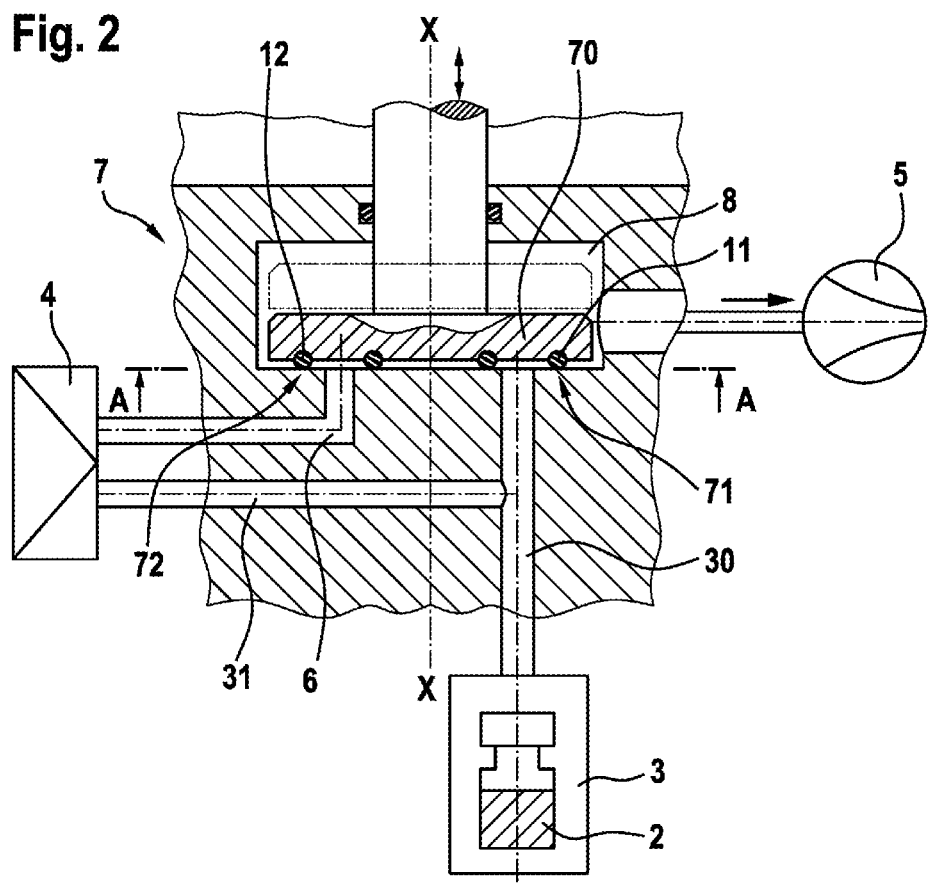
FIG. 2 shows a schematic sectional view of the arrangement in FIG. 1.

As can be seen from FIG. 2, both the first sealing element 11 and the second sealing element 12 are arranged on the valve 7, to be more precise on the closing element 70. In this arrangement, the closing element 70 is designed as a piston, which comprises grooves for accommodating the first and second sealing elements 11, 12, which are introduced on the bottom side.

In this case, FIG. 2 shows the closed state of the valve 7. The valve 7 can be moved in both directions for opening and closure by means of an actuator (not shown), e.g. a pneumatically acting actuator or a magnetic actuator.

Figure 3:
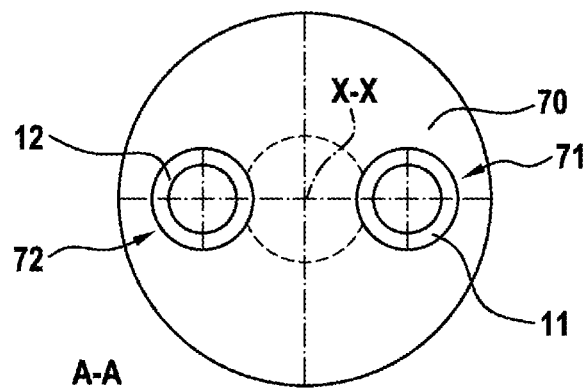
FIG. 3 shows a schematic sectional view along the line A-A in FIG. 2.

As can be seen from FIG. 3, the first and second sealing elements 11, 12 are designed as ring seals and are each embodied in the same way.

In the closed state shown in FIG. 2, the first and second sealing elements seal both the reference space 6 and the testing chamber 3 at the first and the second sealing seat 71, 72 without additional switching effort. As can also be seen from FIG. 2, the reference space 6 is provided as a separate passage in a component which leads from the underside of the closing element 70 to the differential pressure sensor 4. A line 30 likewise leads to the testing chamber 3, wherein a branch line 31 branches off from line 30 and leads to the differential pressure sensor 4.

The differential pressure sensor 4 can thus detect the pressure in the reference space 6, on the one hand, and also the pressure in the testing chamber 3 via the branch line 31 and line 30.

The arrangement 1 according to the invention for testing the tightness of a container 2 operates as follows. In a first step, the container 2 is introduced into the testing chamber 3, wherein the pressure prevailing in the testing chamber 3 is still ambient pressure. The testing chamber 3 is sealed off and the valve 7 is opened. If the pressure-altering device 5 is already active at this stage, the pressure in the testing chamber 3 and in the reference space 6 will adjust to this pressure, that is to say, in the case of vacuum production by the pressure-altering device 5, a vacuum is also produced in the testing chamber 3 and the reference space 6. As an alternative, however, it is likewise also possible to start up the pressure-altering device 5 only after the opening of the valve 7, and thus to produce the pressure alteration in the testing chamber 3 and the reference space 6 afterwards.

The valve 7 is closed again when a predetermined reduced pressure has been reached in the testing chamber 3 and in the reference space 6 and/or when a predefined time has elapsed. In this case, the first and second sealing elements 11, 12 close off the reference space 6 and the testing chamber 3 simultaneously since the two sealing elements 11, 12 are arranged on a flat bottom side of the closing element 70. Thus, the pressure prevailing in the testing chamber 3 and in the reference space 6 is identical and can be detected by the differential sensor 4 with its two separate sensor channels.

If the container 2 then exhibited a lack of tightness, a pressure rise would take place in the testing chamber 3 owing to the escaping gas or the escaping liquid since the pressure in the container 2 is higher than the pressure in the testing chamber 3. The differential pressure sensor 4 would thus detect a pressure rise in the testing chamber 3 by indicating a pressure difference. If an excess pressure had been produced in the testing chamber 3, the pressure would fall in the testing chamber 3 in the event of a crack or the like in the container 2 since gas would flow into the container 2. In this case, the differential pressure sensor 4 can then once again likewise detect a pressure difference between the reference space 6 and the testing chamber 3.

Thus, according to the invention, two valve functions can be carried out simultaneously with one stroke of the valve 7, and nevertheless very tight sealing of the testing chamber 3 and of the reference space 6 is made possible. As a result, it is possible, according to the invention, to perform highly accurate measurement of pressure changes with respect to time in the testing chamber relative to the reference space 6, thus ensuring high reliability in the testing of the tightness of a container 2. At the same time, only a very low outlay in terms of control is required according to the invention and, in particular, there is no need to use additional safety circuits or the like. Here, the use of the differential pressure measurement method allows significantly more accurate pressure measurement or measurement of pressure changes than an absolute pressure measurement method, for example. Nevertheless, outlay on circuitry can be kept very low according to the invention, despite the use of the more accurate differential pressure measurement method.

Figure 4:
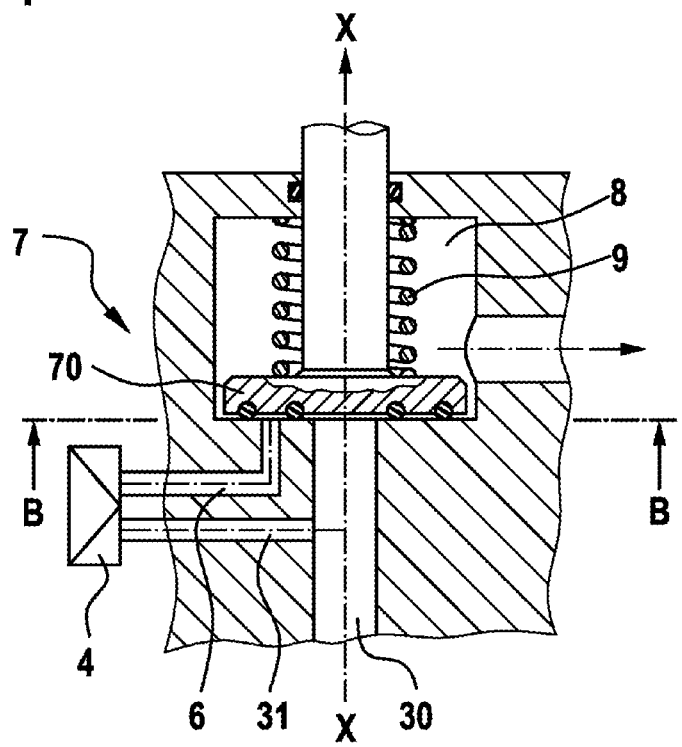
FIG. 4 shows a schematic sectional view of an arrangement in accordance with a second illustrative embodiment of the invention.
Figure 5:
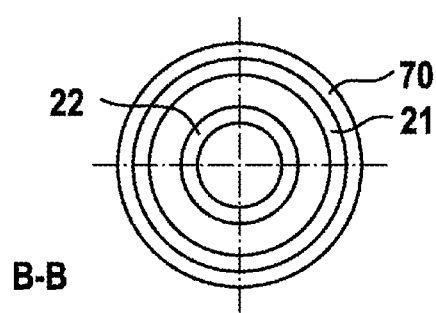
FIG. 5 shows a schematic sectional view along the line B-B in FIG. 4.
Figure 6:
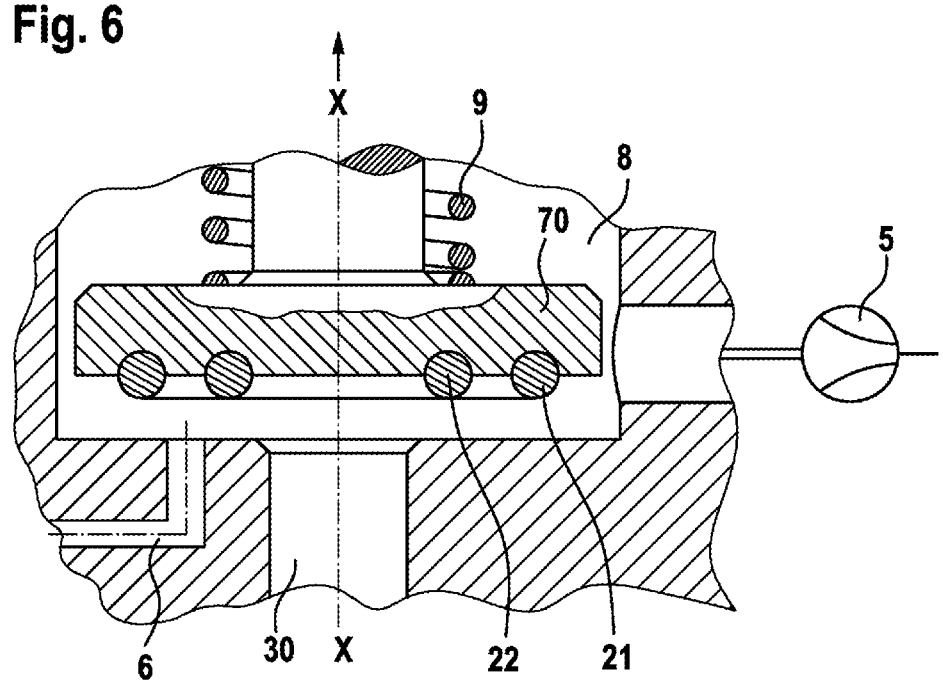
FIG. 6 shows an enlarged schematic view of the arrangement in FIG. 4.

FIGS. 4 to 6 show an arrangement for testing the tightness of a container 2 in accordance with a second illustrative embodiment of the invention. As can be seen especially from FIG. 5, a first sealing element 21 and a second sealing element 22, which are arranged coaxially with a central axis X-X of the valve 7, are provided in the second illustrative embodiment. Here, the second sealing element 22 is arranged radially inside the first sealing element 21 (cf. especially FIG. 5). In this arrangement, the testing chamber 3 is sealed off by means of the second sealing element 22. In this case, the reference space 6 is sealed off by means of the first sealing element 21 and the second sealing element 22 since there is an opening from the reference space 6 between these two sealing elements (cf. FIGS. 4 and 6). The coaxial arrangement of the two sealing elements 21, 22 thus allows a simple construction. In the second illustrative embodiment, a return element 9 is furthermore provided, said element holding the valve in the closed position, which is shown in FIG. 4, when not actuated. In contrast, FIG. 6 shows the open position of the valve 7.

Figure 7:
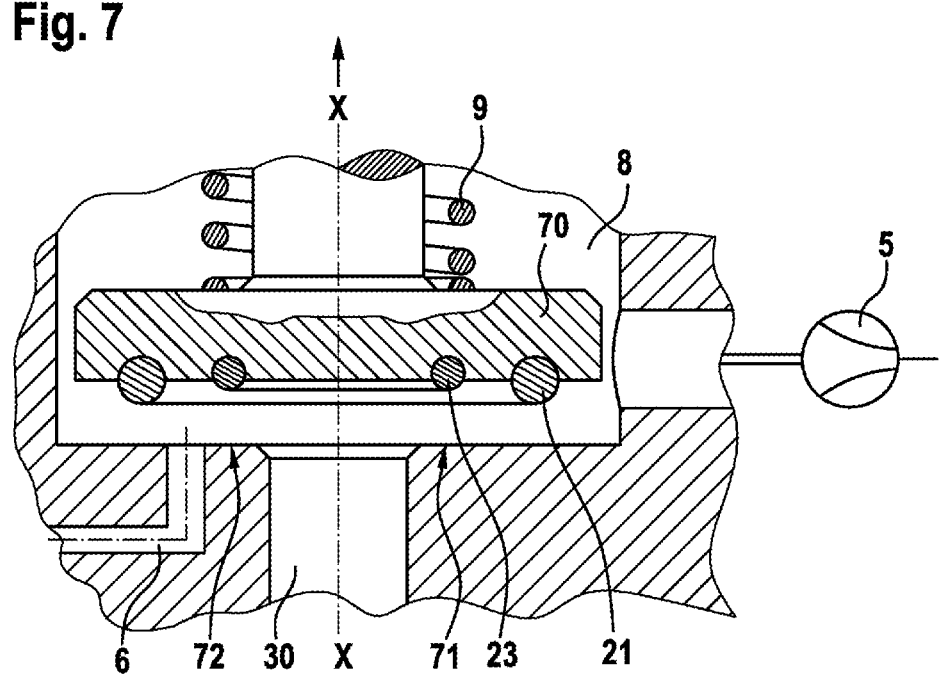
FIG. 7 shows a schematic sectional view of an arrangement in accordance with a third illustrative embodiment of the invention.

FIG. 7 shows an arrangement 1 for testing the tightness of a container 2 in accordance with a third illustrative embodiment of the invention. The third illustrative embodiment corresponds substantially to the second illustrative embodiment, wherein there is likewise a coaxial arrangement of the first and second sealing elements 21, 22. However, the cord thicknesses or cross sections of the first sealing element 21 and of the second sealing element 23 are different in the third illustrative embodiment. The second sealing element 23 of the third illustrative embodiment has a significantly smaller cord thickness than a cord thickness of the first sealing element 21. It is thereby possible in a simple manner to obtain closure or sealing of the testing chamber 3 and of the reference space 6 in a manner which is offset in terms of time. In the third illustrative embodiment, as can be seen from FIG. 7, sealing is achieved first at the first sealing seat 71 by means of the first sealing element 21 during the closing process. Since a cord diameter of the second sealing element 23 is smaller than that of the first sealing element 21, there is still a connection between the reference space 6 and the testing chamber 3, and therefore there is joint sealing of the testing chamber 3 and of the reference space 6 with respect to the antechamber 8, but the testing chamber 3 and the reference space 6 can communicate with one another. Only when the valve 7 is completely closed does the second sealing element 23 also come into sealing contact on the second sealing seat 72, thus bringing about a separation between the reference space 6 and the testing chamber 3. The opening and closing processes can thus take place with a certain time delay. It is thereby possible to allow a final pressure equalization between the reference space 6 and the testing chamber 3 in the third illustrative embodiment, irrespective of fluctuations in a pressure in the antechamber 8.

Figure 8:
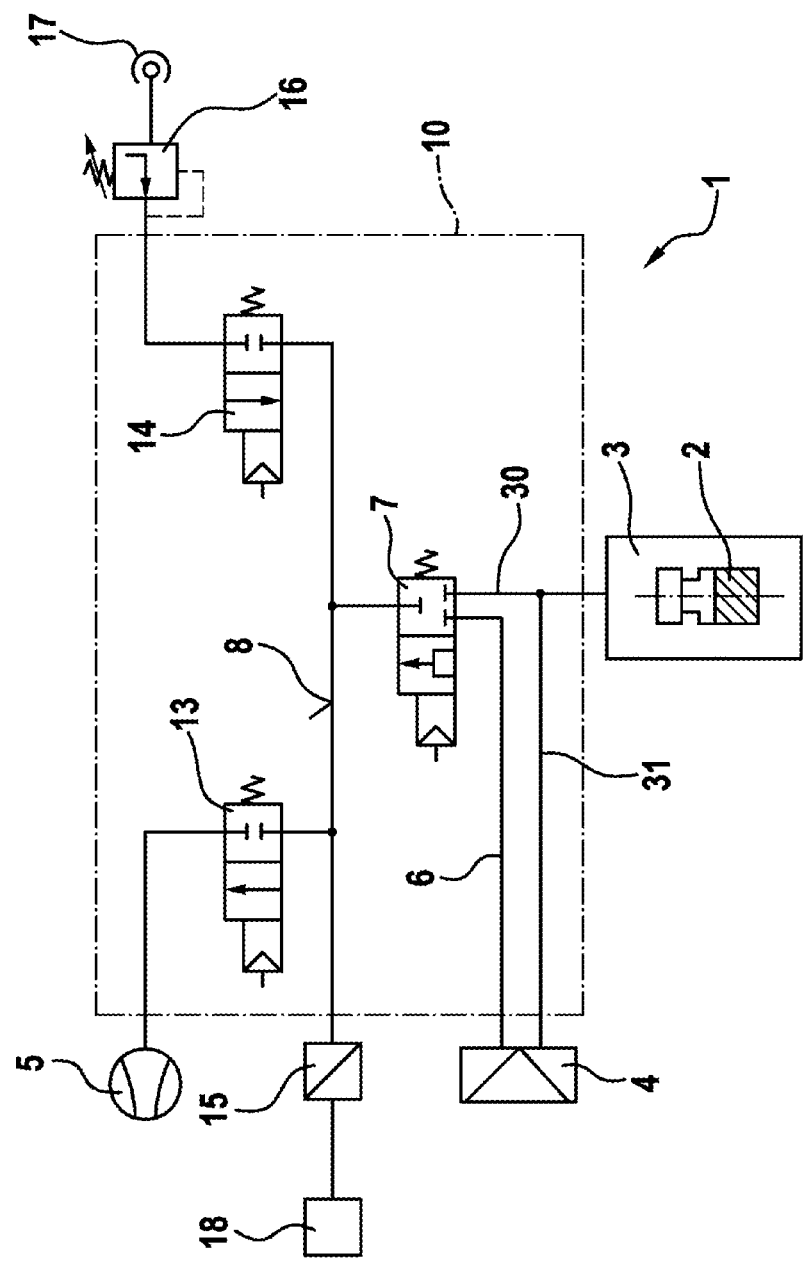
FIG. 8 shows a schematic illustration of an arrangement in accordance with a fourth illustrative embodiment of the invention.
Figure 9:
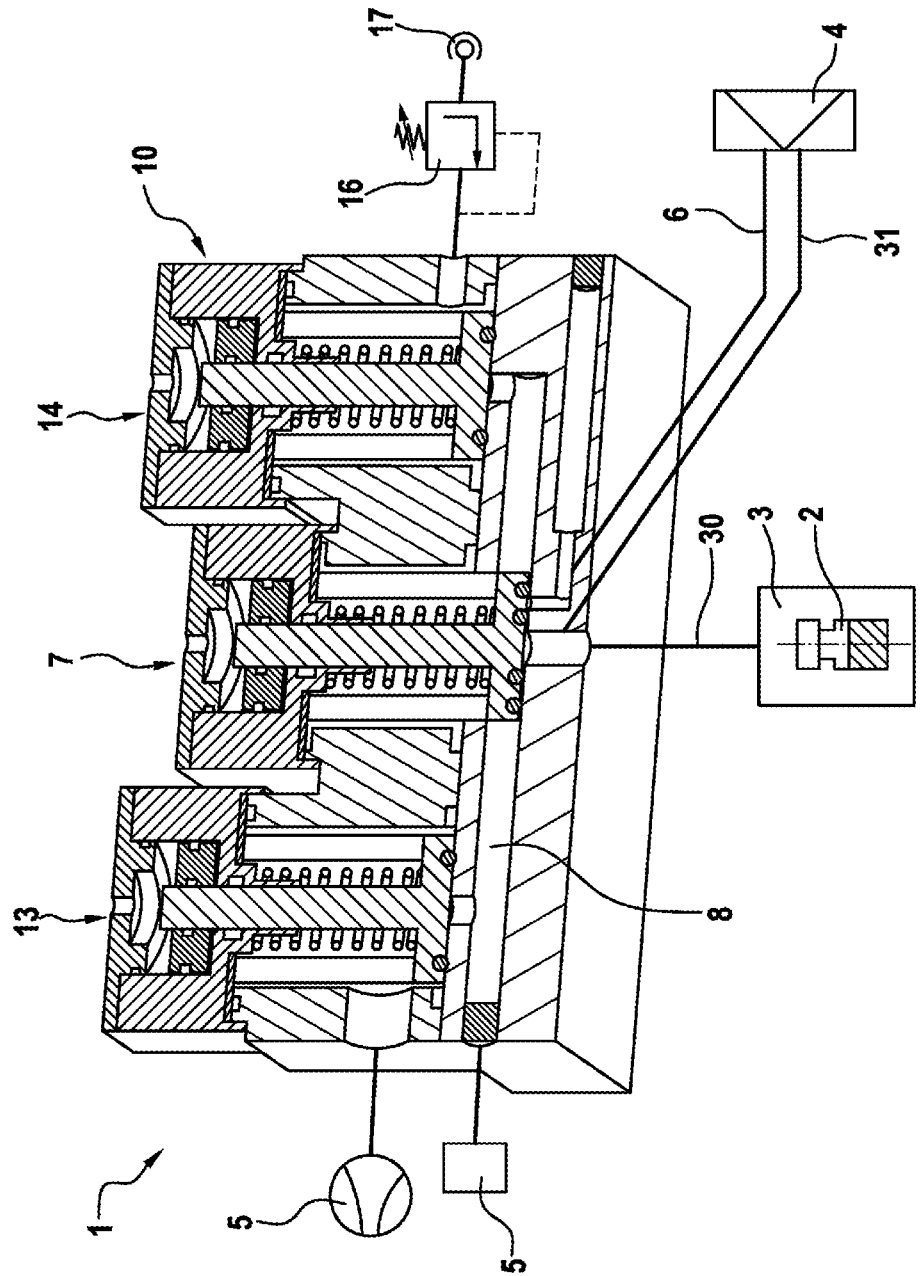
FIG. 9 shows a schematic sectional view of the arrangement in FIG. 8

FIGS. 8 and 9 show an arrangement 1 for testing the leaktightness of a container 2 in accordance with a fourth illustrative embodiment of the invention. The fourth illustrative embodiment corresponds substantially to the first illustrative embodiment although, in addition, a filling valve 13 and a vent valve 14 are provided in order to be able to carry out the advance and/or the subsequent large leak test. For this purpose, the valves 7 and 13 and 14 form an antechamber 8 which can be shut off, the pressure in which can be determined by the absolute pressure sensor 15.

The advance large leak test using a vacuum is implemented as follows: the valve 7 and the vent valve 14 are closed and the antechamber 8 is evacuated to a reduced pressure/vacuum via the open filling valve 13 by the pressure-altering device 5, which produces a vacuum. The absolute pressure sensor 15 measures this reduced pressure. Evacuation can continue until a specified reduced pressure is reached or can be determined by specifying a time until the closure of the filling valve 13. After the closure of the filling valve 13, the absolute pressure sensor 15 determines the existing reduced pressure and transmits this value to an evaluation unit 18.

In parallel with this evacuation process in the antechamber 8, the testing chamber 3 with the container 2 placed therein has been closed and is at ambient pressure. After the opening of the valve 7, there is now a pressure equalization in the two chambers and a new common pressure is established, corresponding to the ratio of the output pressures and of the chamber volumes. This common equalization pressure established is likewise measured by the absolute pressure sensor 15 and transmitted to the evaluation unit 18 for comparative assessment with the previously determined measured reduced pressure value in the antechamber 8 and the ambient pressure. If there is a large leak in the container 2, the common pressure established will be higher than without a large leak in the container 2 because the gas space in the container 2 forms an enlargement of the equalization space with the ambient pressure. After large leak testing, the actual fine measurement with a vacuum or a reduced pressure begins.

As an alternative thereto, the advance large leak test at excess pressure would be implemented as follows: the valve 7 and the filling valve 13 are closed and the antechamber 8 is brought to an excess pressure by the pressure supply 17 having an interposed pressure regulating stage 16 (pressure regulator) via the open vent valve 14. The absolute pressure sensor 15 measures this excess pressure. Filling can continue until a specified excess pressure is reached or can be determined by specifying a time until the closure of the vent valve 14. After the closure of the vent valve 14, the absolute pressure sensor 15 determines the existing excess pressure and transmits this value to an evaluation unit 18. In parallel with this filling process in the antechamber 8, the testing chamber 3 with the container 2 placed therein has been closed and is at ambient pressure. After the opening of the measuring valve 7, there is now a pressure equalization in the two chambers and a new common pressure is established, corresponding to the ratio of the output pressures and of the chamber volumes. This common equalization pressure established is likewise measured by the absolute pressure sensor 15 and transmitted to the evaluation unit 18 for comparative assessment with the previously determined measured excess pressure value in the antechamber 8 and the ambient pressure. If there is a large leak in the container 2, the common pressure established will be lower than without a large leak in the container 2 because the gas space in the container 2 forms an enlargement of the equalization space with the ambient pressure. After large leak testing, the actual fine measurement with a vacuum or excess pressure begins.

The subsequent large leak test using a vacuum is preferably implemented after a fine measurement using excess pressure. The testing chamber 3 is then provided with an excess pressure at the end of the fine measurement process. The large leak test is now implemented as follows: the valve 7 and the vent valve 14 are closed and the antechamber 8 is evacuated to a reduced pressure/vacuum via the open filling valve 13 by the vacuum-producing device 5. The absolute pressure sensor 15 measures this reduced pressure. Evacuation can continue until a specified reduced pressure is reached or can be determined by specifying a time until the closure of the filling valve 13. After the closure of the filling valve 13, the absolute pressure sensor 15 determines the existing reduced pressure and transmits this value to an evaluation unit 18. After the opening of the measuring valve 7, there is now a pressure equalization in the two chambers and a new common pressure is established, corresponding to the ratio of the output pressures and of the chamber volumes. This common equalization pressure established is likewise measured by the absolute pressure sensor 15 and transmitted to the evaluation unit 18 for comparative assessment with the previously determined measured reduced pressure value in the antechamber 8 and the excess pressure value in the testing chamber 3, which is known from the fine measurement. If there is a large leak in the container 2, the common pressure established will be higher than without a large leak in the container 2 because the gas space in the container 2 forms an enlargement of the equalization space with the ambient pressure. After large leak testing, the measurement process is complete.

The subsequent large leak test using excess pressure is preferably implemented after a fine measurement using a vacuum. The testing chamber 3 is then provided with a vacuum at the end of the fine measurement process. The large leak test is now implemented as follows: the valve 7 and the filling valve 13 are closed and the antechamber 8 is brought to an excess pressure by the pressure supply 17 having an interposed pressure regulating stage 16 via the open vent valve 14. The absolute pressure sensor 15 measures this excess pressure. Filling can continue until a specified excess pressure is reached or can be determined by specifying a time until the closure of the vent valve 14. After the closure of the vent valve 14, the absolute pressure sensor 15 determines the existing excess pressure and transmits this value to an evaluation unit 18. After the opening of the valve 7 there is now a pressure equalization in the two chambers and a new common pressure is established, corresponding to the ratio of the output pressures and of the chamber volumes. This common equalization pressure established is likewise measured by the absolute pressure sensor 15 and transmitted to the evaluation unit 18 for comparative assessment with the previously determined measured excess pressure value in the antechamber 8 and the reduced pressure value in the testing chamber 3, which is known from the fine measurement. If there is a large leak in the container 2, the common pressure established will be lower than without a large leak in the container 2 because the gas space in the container 2 forms an enlargement of the equalization space under a vacuum. After large leak testing, the measurement process is complete.

The arrangement 1 illustrated represents a universal valve circuit for the various process sequences comprising large leak testing and fine measurement, in which a very wide variety of embodiments with or without the filling valve 13 and with or without the vent valve 14 can be implemented, depending on the toxicity of the product to be tested in the container 2, on the one hand, and a requirement for short test cycles, on the other hand.

As can furthermore be seen from FIG. 9, the valve 7, the filling valve 13 and the vent valve 14 are arranged in a valve block 10. It is thereby possible to achieve a particularly compact and space-saving construction of the arrangement 1.

The invention claimed is:

1. An arrangement for testing the tightness of a container, the arrangement comprising: a testing chamber configured to have the container to be tested located therein, a pressure-altering device configured to alter a pressure in the testing chamber relative to a pressure in the container, a differential pressure sensor configured to determine a pressure difference between a reference pressure in a reference space and a pressure in the testing chamber, and a valve having a closing element, a first sealing seat and a second sealing seat, wherein the first sealing seat comprises a first sealing element for sealing the reference space in relation to an antechamber, and wherein the second sealing seat comprises a second sealing element for sealing the testing chamber in relation to the antechamber.

2. The arrangement as claimed in claim 1, characterized in that at least one of the first sealing element and the second sealing element is arranged on the closing element.

3. The arrangement as claimed in claim 1, characterized in that the first sealing element and the second sealing element are formed with the same diameter.

4. The arrangement as claimed in claim 1, characterized in that the first sealing element and the second sealing element are arranged coaxially with a central axis (X-X) of the valve.

5. The arrangement as claimed in claim 1, characterized in that the first sealing element and the second sealing element have an identical cross section.

6. The arrangement as claimed in claim 1, characterized in that the first sealing element has a different cross section from the second sealing element.

7. The arrangement as claimed in claim 1, further comprising a filling valve, which is connected to the antechamber.

8. The arrangement as claimed in claim 1, further comprising a valve block for receiving all components of the arrangement.

9. A method for testing the tightness of a container arranged in a testing chamber, the method comprising the following steps: altering a pressure in the testing chamber and in a reference space, sealing off the testing chamber and the reference space using a single valve, wherein the valve has a first sealing seat and a second sealing seat, wherein the testing chamber is sealed off at the first sealing seat and the reference space is sealed off at the second sealing seat, and comparing a pressure in the testing chamber and a pressure in the reference space using a differential pressure sensor, which can detect the presence of a pressure difference between the testing chamber and the reference space.

10. A method for testing the tightness of a container arranged in a testing chamber, the method comprising the following steps: altering a pressure in an antechamber, in a testing chamber and in a reference space, sealing off the testing chamber and the reference space using a single valve, wherein the valve has a first sealing seat and a second sealing seat, wherein the testing chamber is sealed off at the first sealing seat and the reference space is sealed off at the second sealing seat, comparing a common pressure resulting after the joining of the antechamber, the testing chamber and the reference space with a reference pressure value to determine the presence of a large leak in a container, and comparing a pressure in the testing chamber and a pressure in the reference space using a differential pressure sensor, which can detect the presence of a pressure difference between the testing chamber and the reference space to determine the presence of a small leak in a container.

11. The method as claimed in claim 9, characterized in that the closure of the testing chamber at the first sealing seat and of the reference space at the second sealing seat takes place simultaneously.

12. The method as claimed in claim 9, characterized in that closure of the testing chamber at the first sealing seat and of the reference space at the second sealing seat takes place successively.

13. The method as claimed in claim 12, characterized in that the testing chamber and the reference space are first of all sealed off from an antechamber by the valve at the first sealing seat, wherein the testing chamber and the reference space are still connected to one another, and are sealed off jointly from the antechamber in order to allow a pressure equalization between the testing and the reference space, and the reference space is then sealed off from the testing chamber at the second sealing seat.

14. The arrangement as claimed in claim 1, characterized in that the first sealing element and the second sealing element have an identical circular cross section.

15. The arrangement as claimed in claim 1, further comprising a vent valve, which is connected to a pressure source.

16. The arrangement as claimed in claim 1, further comprising an absolute pressure sensor for measuring an absolute pressure in the antechamber.

17. The arrangement as claimed in claim 1, further comprising a filling valve, which is connected to the antechamber, a vent valve, which is connected to a pressure source, and an absolute pressure sensor for measuring an absolute pressure in the antechamber.

* * * * *